Jan. 24, 1933. M. H. RICE 1,895,134
ELEVATOR AND LATERAL SHIFT APPLIANCE FOR MOTOR VEHICLES
Filed May 16, 1930 3 Sheets-Sheet 3
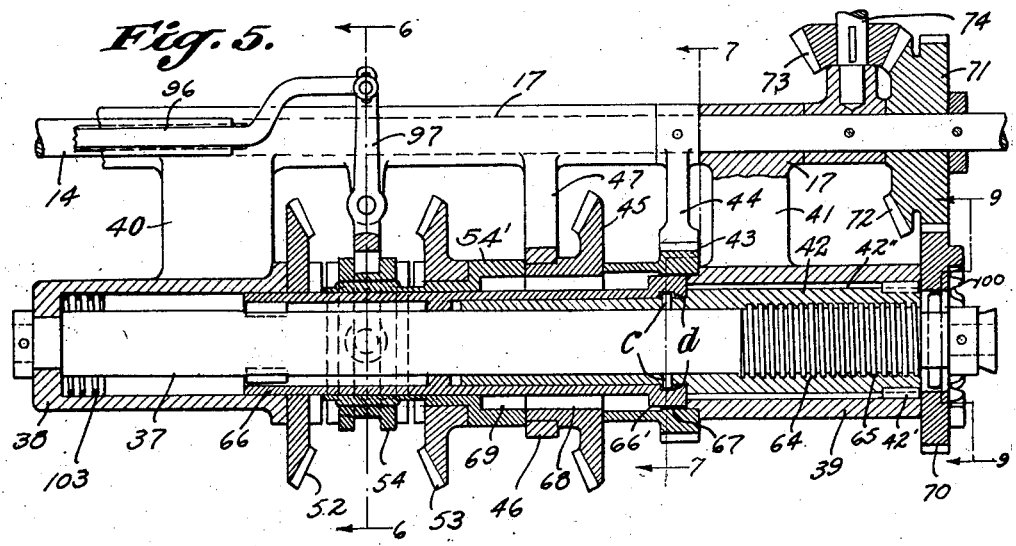
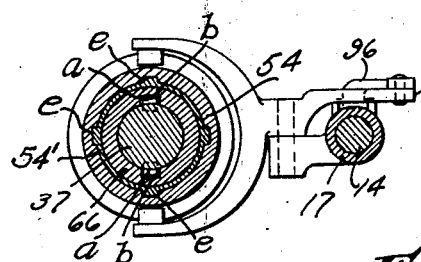
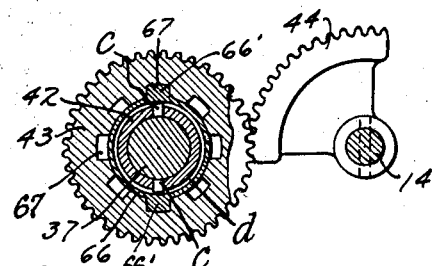
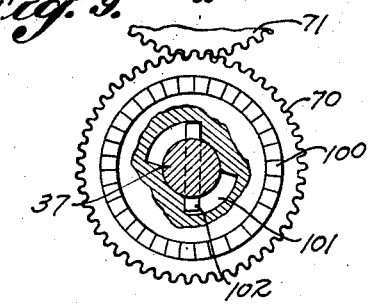
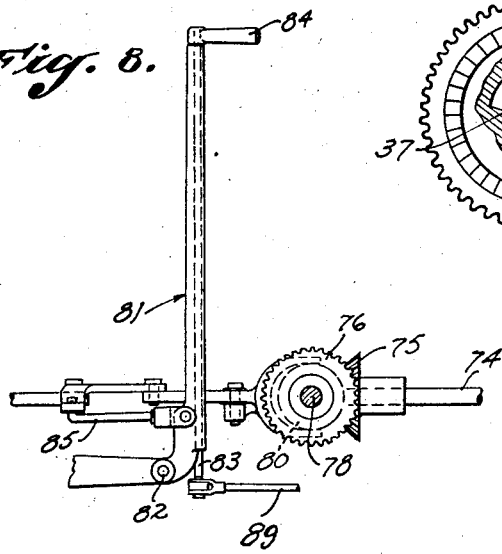
INVENTOR:
Merrit H. Rice;
BY
R. S. Berry
ATTORNEY.

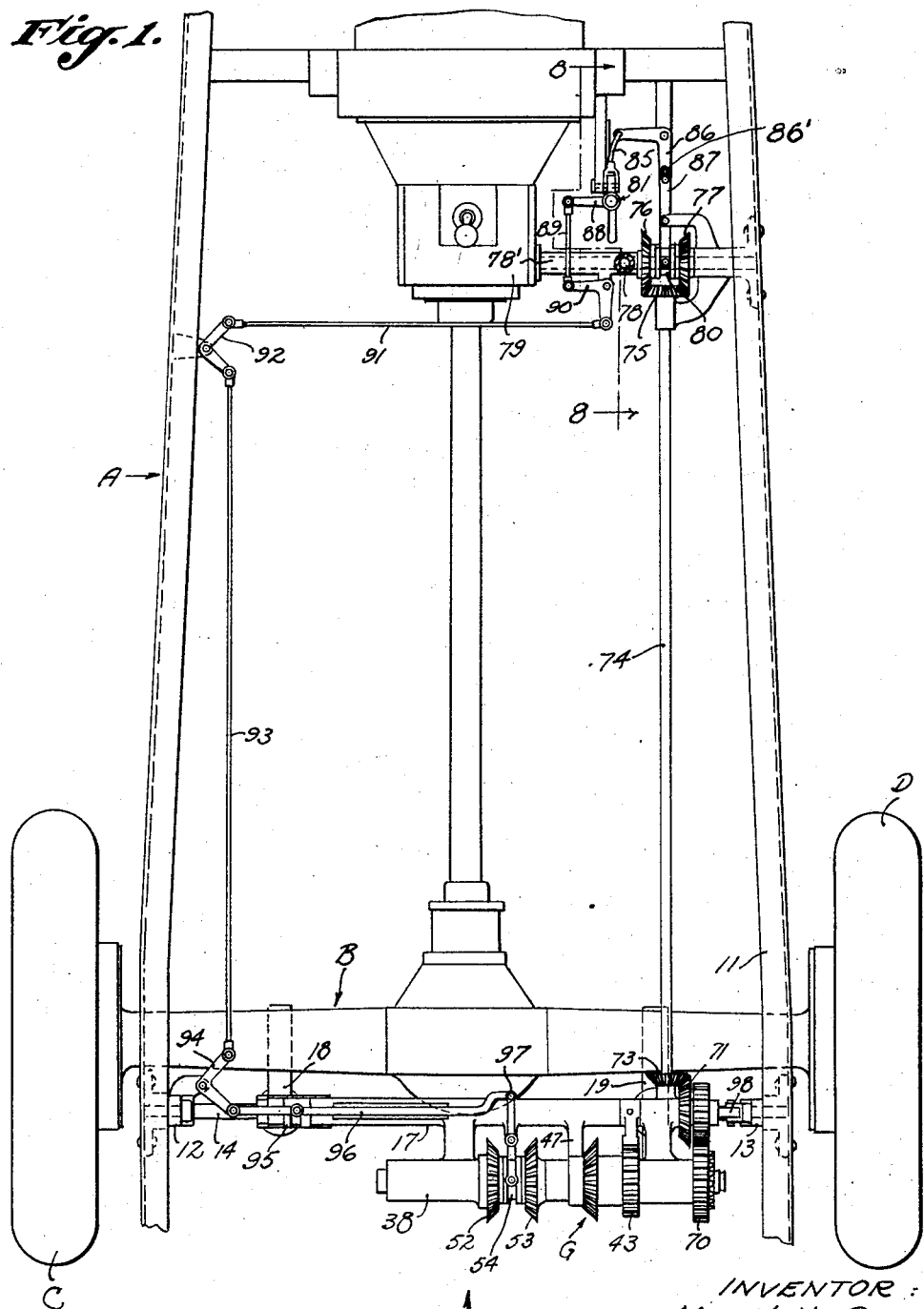

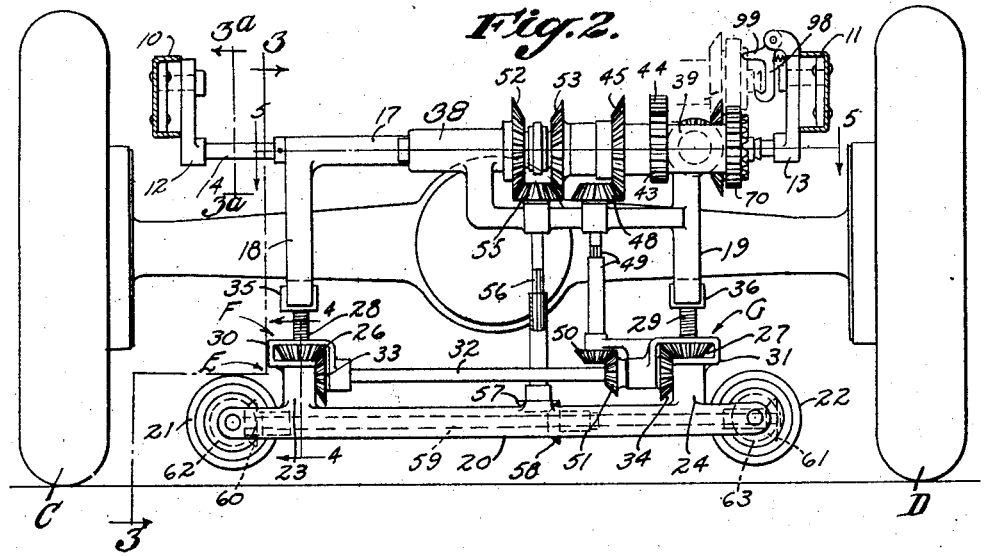

Patented Jan. 24, 1933

1,895,134

UNITED STATES PATENT OFFICE

MERRIT H. RICE, OF PASADENA, CALIFORNIA, ASSIGNOR OF ONE-HALF TO GEORGE R. LANGTREE AND BEATRICE E. S. LANGTREE, OF PASADENA, CALIFORNIA

ELEVATOR AND LATERAL SHIFT APPLIANCE FOR MOTOR VEHICLES

Application filed May 16, 1930. Serial No. 453,062.

This invention relates to a motor vehicle appliance for effecting vertical and lateral movement of the vehicle, and has as its primary object the provision of a means whereby a motor vehicle may be elevated and shifted laterally under its own power, and whereby such movements of the vehicle may be readily controlled by the operator from the driver's seat.

Another object of this invention is to provide a combined jack and lateral shift mechanism for motor vehicles which is operable to lift and support the vehicle rear axle and to effect lateral movement of the rear end portion of the vehicle under mechanical power.

Another object is to provide a combined jack and dolly attachment for motor vehicles including means whereby the jack and dolly may be driven from a single drive shaft and yet be separately controlled.

Another object is to provide a combined elevator and dolly attachment for motor vehicles which is adapted to be carried by the vehicle frame and to be automatically swung in and out of operative relation to a vehicle axle and also be automatically operated to effect raising and lowering of the vehicle axle relatively to the ground, whereby the vehicle wheels may be positioned clear of the ground and the vehicle then supported on transverse rollers so that the vehicle may then be shifted laterally on said rollers, and also to provide manually controlled means whereby the lateral rollers may be driven to effect lateral movement of the vehicle in either direction while in its elevated position.

Another object is to provide an appliance of the above character in which the vehicle elevator may be automatically actuated when set in operation but under manual control, and in which the lateral shift mechanism may be operated entirely at the will and under the control of the operator, and which embodies a control mechanism so formed and arranged as to be easily manipulated.

Another object is to provide a vehicle elevating and lateral shift mechanism which is adapted to be designed for application to motor vehicles now generally in use, either as an accessory attachment or as a part of the vehicle equipment.

Another object is to provide an appliance of the above character which is simple in construction and efficient in operation.

With the foregoing objects in view, together with such other objects and advantages as may subsequently appear, the invention resides in the parts and features, and in the combination, construction and arrangement of parts hereinafter described and claimed and illustrated by way of example in the accompanying drawings, in which:

Fig. 1 is a plan view showing the device as applied to a motor vehicle and illustrating it as arranged in association with the vehicle rear axle housing with the parts disposed in operative relation to the rear axle housing;

Fig. 2 is a view in elevation as seen in the direction indicated by the arrow "2" in Fig. 1;

Fig. 3 is a view in section and elevation as seen on the line 3—3, Fig. 2;

Fig. 3ª is a detail in section and elevation as seen on the line 3ª—3ª of Figure 2;

Fig. 4 is a detail in section taken on the line 4—4 of Fig. 2;

Fig. 5 is a detail in horizontal section as seen on the line 5—5 of Fig. 2;

Fig. 6 is a view of cross section as seen on the line 6—6 of Fig. 5;

Fig. 7 is a view in cross section taken on the line 7—7 of Fig. 5;

Fig. 8 is a view of the control mechanism as seen on the line 8—8 of Fig. 1 with parts removed;

Figure 9 is a view in section and elevation as seen on the line 9—9 of Figure 5.

Referring to the drawings more specifically, A indicates generally the frame of a motor vehicle and B designates the vehicle rear axle housing containing the usual rear axle fitted with traction wheels C and D.

Mounted on the side members 10 and 11 of the vehicle frame is a pair of vertically movable hangers 12 and 13 on which is fixedly carried a rod 14 arranged to extend transversely of the motor vehicle frame at a point adjacent to, but rearward of the rear axle housing B. Each of the hangers 12 and 13 is formed with a vertical slot 15 as particularly shown in Fig. 3ª, which slot is engaged by a pin 16 carried on the vehicle side frame member and whereby the hangers 12 and 13 with the transverse bar 14, may be shifted vertically with relation to the frame and rear axle. Turnably mounted on the bar 14 is a rocker sleeve 17 on which is carried a dolly indicated generally at E; the sleeve 17 being formed with a pair of spaced parallel members 18 and 19 which are connected to the dolly E through a pair of jacks F and G, respectively.

The dolly E embodies a transverse bar 20 on the outer ends of which is mounted a pair of rollers 21 and 22, the axles of which extend at right angles to the axes of the vehicle wheels C and D. The dolly also includes internally threaded tubular members 23 and 24, constituting portions of the jacks F and G; said portions being engaged by externally threaded tubes 25 as shown in Fig. 4, which tubes are affixed to beveled gears 26 and 27, and which are screwed on threaded stems 28 and 29 fixed on the members 18 and 19; the gears 26 and 27 being confined between yokes 30 and 31 slidably engaging a shaft 32 extending parallel with the bar 20, and which shaft carries beveled gears 33 and 34, which mesh with the gears 26 and 27, respectively.

The dolly E is designed to normally extend in substantially horizontal position beneath the vehicle body carried on the frame A as indicated in the dotted lines by Fig. 3, termed the inoperative position, and is designed to be swung to a substantially vertical position termed the operative position, as shown in full lines in Fig. 3, in which latter position, projections 35 and 36 on the members 18 and 19 extend beneath the rear axle housing in slightly spaced vertical relation thereto.

Means are provided for swinging the dolly to and from its operative position and for mechanically driving the jacks F and G, and for propelling the dolly wheels 21 and 22, and which means is here shown in Fig. 5 as including a revoluble shaft 37, extending parallel with the fixed bar 14 and supported in a pair of spaced housings 38 and 39 affixed through brackets 40 and 41 to the rocker sleeve 17. Encompassing the shaft 37 and shiftable longitudinally thereof is a nonturnable sleeve 42, and loosely encompassing the sleeve 42 is a spur gear 43 which meshes with a toothed segment 44 fixed on the bar 14, and which gear 43 is adapted on being rotated a partial revolution to traverse the toothed segment 44, and thereby effect swinging of the dolly to and from its operative position according to the direction of rotation of the gear 43. A beveled gear 45 loosely encircles the sleeve 42 and is engaged in a bearing 46 carried on a bracket 47 connected with the rocker sleeve 17; the gear 45 meshing with a beveled gear 48 on a shaft 49 fitted with a beveled gear 50, meshing with a beveled gear 51 on the shaft 32 whereby on rotation of the gear 45, the jacks F and G will be operated.

Loosely encircling the shaft 37 is a pair of opposed beveled gears 52 and 53, between which is interposed a clutch sleeve 54, adapted to be moved into engagement with either of the gears 52 and 53 to effect engagement of either of said gears with the shaft 37 through the sleeve 42 as will be later described. The gears 52 and 53 engage a gear 55 on a shaft 56, fitted with a gear 57 meshing with a gear 58 on a shaft 59 carried on the bar 20 and which shaft 59 is fitted with beveled gears 60 and 61 meshing with complementary gears 62 and 63 affixed to the axles of the dolly wheels 21 and 22, respectively, whereby on rotation of the gears 52 and 53, the dolly wheels may be driven in either direction.

The gears 43 and 45 and the clutch sleeve 54, are designed to be successively operatively connected to and disconnected from the shaft 37, and for this purpose the shaft 37 is formed with a threaded end portion 64 engaging an internally threaded portion 65 of the sleeve 42, whereby on rotation of the shaft 37, the sleeve 42 will be advanced longitudinally of shaft 37; the sleeve 42 being held against rotation by means of splines 42' slidably engaging longitudinal grooves 42" in the housing 39. Revolubly encompassing the inner end portion of the sleeve 42 is a sleeve 66 which projects beyond the inner end of the sleeve 42 and slidably extends through the clutch sleeve 54; the sleeve 66 being splined to the shaft 37 by keys a carried by the shaft 37 and slidably engaging longitudinally extending channels b formed interiorly of the sleeve 66. Studs c carried on the sleeve 42 project into and slidably engage a channel d extending around the inner periphery of the sleeve 66, whereby longitudinal movement of the sleeve 42 will effect corresponding movement of the sleeve 66 yet permit rotation of the sleeve 66 around the sleeve 42 on rotation of the shaft 37. The clutch sleeve 54 is splined by keys c on a sleeve 54' which slidably encompasses the sleeve 66 and passes freely through the gear 53 and has an enlarged end portion which extends between the hubs of the gears 53 and 45. The sleeve 66 is formed at the end thereof overlapping the sleeve 54 with a pair of diametrically opposed feathers 66' which are successively engageable with key-ways 67, 68, and 69 formed respectively in the gears 43 and 45 and clutch engaging sleeve 54', as the sleeve 42 is shifted longitudinally of the shaft 37.

A gear wheel 70 on the shaft 37 meshes with a gear wheel 71 loosely mounted on the rod 14, and which gear 71 is formed with a beveled gear 72, which meshes with a beveled pinion 73 on a drive shaft 74 extending forwardly of the vehicle frame A. The shaft 74 is designed to be driven in either direction from the power plant of the motor vehicle; being here shown in Fig. 1 as fitted at its forward end with a beveled gear 75, which meshes with a pair of beveled gears 76 and 77 loosely mounted on a shaft 78 in a housing 78' which shaft is driven continuously as from the transmission gears in the gear case 79 in any desired manner. A clutch 80 is provided between the gears 76 and 77 which is preferably of the friction type and is splined on the shaft 78 and is adapted to effect drive connection between the shaft 78 and either of the gears 76 and 77 to drive the shaft 74.

Means are provided for manually controlling the operation of the shaft 74 by shifting the clutch 80, and also for manually controlling the drive of the dolly wheels 21 and 22 by shifting the clutch sleeve 54, and which means is here shown particularly in Fig. 8 as comprising a tubular lever 81 pivoted at 82, and in which is mounted a turnable shaft 83 which projects above the upper end of the lever 81 and is fitted with a hand lever 84 whereby the shaft 83 may be turned within the lever 81. The lever 81 connects through a link 85 with a bell crank lever 86, connected through a lost-motion slot 86' with a rocker arm 87 engaging the clutch 80, whereby on rocking the lever 81 in one direction, the clutch 80 will engage the gear 76, and on rocking the lever 81 in the opposite direction will engage the gear 77. The lower end of the shaft 83 is fitted with an arm 88 connected by a link 89 to a bell crank lever 90, which in turn connects with a link 91 leading to one arm of a bell crank lever 92, the other arm of which connects with a rod 93, leading to one arm of a bell crank lever 94, the other arm of which connects with a sleeve 95 slidably supported on the rocker sleeve 17 and connected to a slide bar 96 leading to a rocker arm 97 engaging the clutch sleeve 54.

The dolly E is normally disposed in its elevated or inoperative position as indicated in dotted lines in Fig. 3, in which position the sleeve 42 is in its fully retracted position as shown in Fig. 5, with the feather 66' engaged with the key-way 67 in the gear 43; the dolly being maintained in such position by means of a catch 98 carried on the vehicle frame and arranged to engage the outer end of the shaft 37 when the latter is disposed in its upper position as indicated by the dotted lines in Fig. 2. The catch 98 is formed with a finger 99 which, when the catch is engaged with the shaft 37, is adapted to project between a pair of adjacent cam faces 100 formed on the outer face of the gear 70 when the latter is at rest. The gear wheel 70 is mounted to have slight relative movement on the shaft 37 for which purpose it is formed with opposed circumferentially extending slots 101 on its inner periphery engaged by a pin 102 extending through the shaft 37 as particularly shown in Fig. 9; this pin and slot affording a lost motion connection between the gear and shaft whereby on initial rotation of the gear 70, the latter turns a partial revolution before effecting rotation of the shaft 37.

In the operation of the invention, assuming the parts to be in a normal position, the shaft 74 is set in motion in a forward direction by the operator rocking the lever 81 to throw the clutch 80 into engagement with, for example the gear 77. Rotation of the shaft 74 drives the gears 73, 72, 71, and 70; the latter initially moving idle on the shaft 37 a partial revolution thereby causing one of the cams 100 thereon to effect disengagement of the catch 98 from the shaft 37, thus releasing the latter so that on continued rotation of the gear 70 and consequent rotation of the shaft 37 the same will act through the sleeve 66 and the feathers 66' thereon to rotate the gear 43 and cause the latter to move downwardly on the toothed segment 44; the feathers 66' being then engaged with the key-way 67 on the gear as shown in Figure 7. During this rotation of the shaft 37 the screw teeth 64 thereon will effect advance of the sleeve 42 longitudinally of the shaft 37 thereby advancing the sleeve 66 and moving the feathers 66' out of engagement with the gear wheel 43 which occurs at the moment the dolly frame has been swung downwardly to its dependent position. Continued rotation of the shaft 37 causes the feathers 66' to move into engagement with the key-ways 68 in the gear 45 thereby driving the jacks F and G in such direction as to initially lower the dolly against the ground and then cause upward movement of the members 18 and 19 so that the projections 35 and 36 will engage the underside of the rear axle housing B and thereby elevate the latter; the slots 15 in the hangers 12 and 13 permitting the slight upward movement of the members 18 and 19 necessary to bring the projections 35 and 36 into engagement with the rear axle housing. The jacks will thus be operated to effect lifting of the rear wheels of the vehicle during the time the feathers 66' are traversing the key-ways 68 in the gear 45.

The parts are so designed that the feather 66' will be advanced out of engagement with the gear 45 and into engagement with the key-ways 69 in the clutch engaging sleeve 54' when the jacks have been extended sufficiently to elevate the wheels of the vehicle several inches from the ground. If at any time during the operation just described, the operator desires to restore the parts to normal, the lever 81 is operated to throw the clutch 80 first into neutral in which position the parts come to rest, and then to dispose the clutch and into engagement with the gear wheel 76 thereby effecting reverse rotation of the shafts 74 which causes reverse rotation of the shaft 37 and retrograde longitudinal movement of the sleeves 42 and 66 and the feathers 66'; the shaft 37 being then rotated in a reverse direction acting to drive the gear 45 in reverse thereby actuating the jacks to lower the vehicle and slightly elevate the dolly and after which the feathers reengage the gear 43 to rotate the latter and cause it to ascend the toothed segment 44 until the shaft 37 is elevated into reengagement with the catch 98 at which point the sleeve 42 reaches the limit of its retracted position thereby inhibiting further rotation of the shaft 37 and causing the clutch 80 to slip, thus indicating to the operator that the dolly is in its elevated position, whereupon the operator may then restore the lever 81 and the clutch 80 to their normal position. After the rear end of the vehicle has been elevated by the jacks as before described and it is desired to shift the rear portion of the vehicle to the right or left, the operator, by manipulation of the lever 84, disposes the clutch engaging sleeve 54' into engagement with either of the gears 52 or 53, whereupon the engaged gear will be driven by rotation of the shaft 37 by reason of the feathers 66' then engaging the clutch sleeve; the dolly wheels then being driven through their gear connection with the operating gear 52 or 53.

The parts are so proportioned that when the feathers 66' engage the clutch engaging sleeve 54', the sleeve 42 will advance clear of the screw threaded portion of the shaft 37 which permits the shaft 37 to continue its rotation without effecting further advance of the sleeve 42. The lateral movement of the rear end of the vehicle in either direction is thus controlled through the clutch sleeve 54 and the hand lever 84; the lateral movement being terminated as desired by throwing the clutch sleeve 54 into its neutral position. After having thus moved the rear portion of the vehicle tranversely to the desired position, the direction of the rotation of the shaft 37 is reversed as before described to effect lowering of the vehicle and to restore the dolly to its elevated position as before described; initial rotation of the shaft 37 causing reengagement of the sleeve 42 with the threaded portion 64 of the shaft 37 which is occasioned by the action of a spring 103, particularly shown in Fig. 5, which is positioned to be placed under tension by the end of the sleeve 66 advancing thereagainst; the spring 103 then acting through the sleeve 66 to advance the sleeve 42 into reengagement with the threads 64.

I claim:

1. In a vehicle lift and shift appliance, a revoluble shaft, a swinging support for said shaft, means for rotating said shaft, a non rotatable sleeve slidable longitudinally of said shaft, a screw connection between said sleeve and shaft, a second sleeve splined on said shaft connected to said first named sleeve to move therewith, feathers on said second sleeve, a pair of gear wheels loosely encompassing said shaft having key-ways, said wheels being arranged to be successively engaged with said second sleeve through said feathers and key-ways, a vertically swinging wheeled dolly, an axle engaging jack carried by said dolly, a fixed segmental rack engaged by one of said gear wheels arranged to be traversed by the latter, connections for effecting swinging movement of said dolly on the last named gear wheel traversing said rack, and gear connections between the other of said gear wheels and said jack for actuating the latter.

2. The construction called for in the preceding claim, together with a second pair of gear wheels loosely encompassing the shaft, a sleeve having key-ways arranged to be engaged with the feathered sleeve, a clutch splined on said key-wayed sleeve, manually operable means for engaging said clutch with either of said second pair of gear wheels, and gear connections between said gear wheels and the wheels of the dolly.

3. In a vehicle jack and shifting mechanism, a wheeled dolly, means for supporting said dolly for vertical swinging movement on a vehicle frame, an axle engaging jack on said dolly, a revoluble shaft on said dolly support, a clutch member encircling said shaft, a sleeve encompassing said shaft splined to said clutch member, a pair of gear wheels loosely encircling said shaft adapted to be alternately engaged by said clutch member, driving connections between said gear wheels and the wheels of said dolly, a second pair of gears loosely encompassing said shaft, means on said shaft actuated by rotation thereof for effecting successive engagement of each of said last named gears and said sleeve with said shaft, gear connections between one of said second pair of gears and said dolly for swinging same, and gear connections between the other of said second pair of gears for actuating said jack.

4. In a motor vehicle having a frame and an axle housing, a transverse bar carried on said frame mounted for free vertical movement relatively to said axle housing and frame, a pair of arms pivoted on said bar to swing vertically, projections on said arms arranged to project beneath said axle housing when said arms are disposed in a dependent position, screw jacks connected to said arms, a wheeled dolly carried by said jacks, and means for actuating said jacks.

5. In a motor vehicle having a frame and an axle housing, hangers mounted on said frame and having lost motion connection therewith, a pair of arms, a pivotal connection between said arms and said hangers on which said arms are mounted to swing vertically, projections on said arms arranged to extend beneath said axle housing when said arms are disposed in a dependent position, a wheeled dolly, jacks connecting said dolly to said arms for raising and lowering said dolly and arms relative to each other, and means for actuating said jacks.

6. In a motor vehicle having a frame and an axle housing, a pair of vertically swinging arms carried by said frame arranged to be positioned to depend adjacent said axle housing, projections on said arms arranged to extend beneath said housing in spaced relation thereto when said arms are in their dependent position, a wheeled dolly, jacks connecting said dolly to said arms for raising and lowering said dolly and arms relative to each other, and lost motion connections between said arms and said frame to permit movement of said projections in and out of engagement with said axle housing on operation of said jacks.

7. The structure called for in claim 6, together with means for swinging said arms in and out of their dependent position, and means for releasably retaining said arms out of their dependent position.

MERRIT H. RICE.